United States Patent
Bender et al.

(10) Patent No.: US 6,609,063 B1
(45) Date of Patent: Aug. 19, 2003

(54) SYSTEM AND METHOD FOR USING A MAP DATABASE WITH ATTRIBUTED NO-OUTLET AND CIRCULAR SEGMENTS

(75) Inventors: Raymond Bender, Elgin, IL (US); Laurence P. Lehman, Lombard, IL (US); Derwin Chow, Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 56 days.

(21) Appl. No.: 09/976,424

(22) Filed: Oct. 12, 2001

(51) Int. Cl.[7] .............................................. G01C 21/32
(52) U.S. Cl. ...................... 701/209; 701/203; 340/995
(58) Field of Search ................................ 701/201, 203, 701/209, 210, 211; 340/990, 995

(56) References Cited

U.S. PATENT DOCUMENTS

| | | | | |
|---|---|---|---|---|
| 5,412,573 A | * | 5/1995 | Barnea et al. | 701/211 |
| 5,608,635 A | * | 3/1997 | Tamai | 701/209 |
| 5,752,217 A | * | 5/1998 | Ishizaki et al. | 701/201 |
| 5,899,955 A | * | 5/1999 | Yagyu et al. | 701/209 |
| 5,938,718 A | * | 8/1999 | Morimoto et al. | 701/201 |
| 6,018,697 A | * | 1/2000 | Morimoto et al. | 701/209 |
| 6,192,314 B1 | | 2/2001 | Khavakh et al. | 701/209 |
| 6,230,099 B1 | * | 5/2001 | Fabian | 701/209 |
| 6,308,177 B1 | * | 10/2001 | Israni et al. | 707/100 |
| 6,438,561 B1 | * | 8/2002 | Israni et al. | 707/104.1 |

* cited by examiner

*Primary Examiner*—Tan Q. Nguyen
(74) *Attorney, Agent, or Firm*—Frank J. Kozak; Jon D. Shutter; Lawrence M. Kaplan (57) ABSTRACT

System and method are provided for route calculation for use with a navigation system and used with a map database with attributed no-outlet and circular segments. A route calculation program adapted to find at least one solution route, between a first location and a second location on a road network, identifies a segment with a first node and a second node in the road network. From an attribute stored in the map database, the program determines whether the first node is connected to the road network and the second node is connected to an isolated portion of the road network. Using the attribute, the route calculation program determines whether to explore the isolated portion of the road network. In some instances, the program refrains from exploring the segment leading into the isolated portion of the road network and the isolated portion of the road network itself. In some other instances, the program suppresses the search from exploring segments inside the isolated portion of the road network, and the program exits the isolated portion by exploring the segment and its successor segments.

19 Claims, 6 Drawing Sheets

SYSTEM AND METHOD FOR USING A MAP DATABASE WITH ATTRIBUTED NO-OUTLET AND CIRCULAR SEGMENTS

REFERENCE TO RELATED APPLICATION

The present application is related to the copending patent application Ser. No. 09/976,539 entitled "SYSTEM AND METHOD FOR FORMING A MAP DATABASE WITH NO-OUTLET AND CIRCULAR SEGMENTS", filed on even date herewith, the entire disclosure of which is incorporated by reference herein.

FIELD OF THE INVENTION

The present invention relates to a system and method for route calculation for use with a navigation system and used with a map database with data attributes.

BACKGROUND OF THE INVENTION

Computer-based navigation systems are able to provide end users, such as vehicle drivers and other travelers, with various navigating functions and features. For example, some navigation systems are able to determine an optimum route to travel by roads between locations in a geographic region. Using input from the end user, and optionally from equipment that can determine the end user's physical location (such as a global positioning system), a navigation 15 system can identify and examine various routes between two locations in the geographic region to determine an optimum route between the locations.

The navigation system may then provide the end user with information about the optimum route in the form of instructions that identify the maneuvers required to be taken by the end user to travel from the starting location to the destination location. The navigation system may be located in an automobile and the instructions may take the form of audio instructions that are provided as the end user is driving the route. Some navigation systems are capable of providing detailed moving map displays outlining the route between locations, the types of maneuvers to be taken along the route, locations of certain types of features or points of interest, and so on.

To provide these and other navigating functions, present navigation systems include navigation application software programs and use one or more detailed databases that include data which represent physical geographic navigable features. The detailed database(s) include data representing the road networks in a geographic region, including the roads and intersections in the region and information about the particular roads and intersections, such as one-way streets, turn restrictions at intersections, speed limits along the roads, street names of the various roads, address ranges along the various roads and so on. Further, the data may include information about points-of-interest such as restaurants, hotels, and so on. Presently, the collection of such geographic data and the provision of such data in a computer-usable database format are provided by Navigation Technologies of Chicago, Ill.

Performance can be an important factor that affects the usefulness of some of the features provided by a navigation system. For example, if a navigation system is used by a driver in a moving vehicle to obtain a route to a destination, guidance for following the route is needed relatively quickly, i.e., within several seconds or less, in order to instruct the driver about required maneuvers at upcoming intersections.

Although performance can be an important factor for navigation systems, there are several considerations that can make performance difficult to achieve. One consideration is that some navigation systems, in particular systems installed in vehicles or handheld devices, may have limited resources, such as relatively slow processors, limited memory, etc. Another consideration is that the geographic databases used by navigation systems are relatively large in order to include the types and detail of information needed to provide the features desired by end users. The relatively large sizes of geographic databases used by navigation systems can be difficult to handle, thereby affecting performance.

Techniques have been devised or implemented to improve navigation system performance by organizing, structuring, or arranging the geographic database or the data in the database in particular ways. Because a navigation system uses geographic data in certain known and expected ways to perform known functions, the geographic data can be organized, structured, or arranged in a manner that facilitates their use in these known ways by the navigation system.

Navigation application programs may also run on computer platforms that have relatively more memory resources and faster I/O, such as personal computers or networks. Although these platforms may have more and faster resources, the considerations related to the efficient use of geographic data still apply, but on a different scale. With these types of platforms, even greater functionality can be provided if the geographic database can be formed and used efficiently.

Accordingly, it is an objective to provide improvements in the storage and/or use of geographic data, and/or the programming that uses the geographic data.

SUMMARY

To facilitate processing of the geographic data, the exemplary embodiments provide an efficient way for reducing the data necessary for consideration in route calculation. The geographic data in a map database represents navigable features such as roadways and intersections. The navigable features include one or more segments (e.g., to represent roadways), which are connected by nodes (e.g., to represent intersections). The present embodiments provide a concise way to use directionally identified and attributed no-outlet and circular segments in route calculations to facilitate the processing of the geographic data, which can provide quicker computation and results.

In an exemplary embodiment, a route calculation program adapted to find at least one solution route, between a first location and a second location on a road network, identifies a segment with a first node and a second node in the road network. From an attribute stored in the map database, the program determines whether the first node is connected to the road network and the second node is connected to an isolated portion of the road network. Using the attribute, the route calculation program determines whether to explore the isolated portion of the road network.

According to another exemplary embodiment, a method for a route calculation search includes retrieving a data structure in a map database that represents a successor segment with a first node and a second node. The method further includes identifying an attribute in the data structure that identifies the successor segment as a segment that connects a road network at the first node with an isolated portion of the road network at the second node. The route calculation search refrains from exploring the isolated portion of the road network if the search retrieved the successor segment at the first node. Alternatively, the route calculation suppresses a search from exploring segments inside the isolated portion of the road network, and explores the segment and its successor segments if a search identified the segment as a no-outlet segment at the second node.

According to another exemplary embodiment, geographic data are transmitted to an end user's computing platform and used by the end user's platform to provide navigation related features to an end user. The method includes transmitting data structures to the end user's computing platform. Each data structure includes fields with data that represent a segment of a road in a road network, and a data attribute in one of the fields that identifies the segment that connects the road network with an isolated portion of the road network. The end user's computing platform uses the attribute to determine whether to explore the isolated portions of the road network.

According to another exemplary embodiment, a navigation system includes a map database for storing attributes that identify the segments of roads that connect a road network with an isolated portion of the road network. The navigation system further includes a navigation program for calculating a route between a first location on the road network represented by the map database and a second location on the road network represented by the map database. The navigation program uses the attributes to determine whether to explore the isolated portions of the road network.

Based on the identification as a no-outlet or circular segment, a route calculation program may determine whether to consider the segment and its successor segments, if any. This can provide for an efficient utilization of computer resources in a navigation system application. Moreover, a faster response and shorter wait times in navigation systems may be achieved. Systems with faster response times may also process and/or provide navigation information more quickly.

DETAILED DESCRIPTION

In a first exemplary embodiment, methods are provided for attributing road segments with concise information that may be used to facilitate route calculation. More specifically, the attributed segments may be utilized to efficiently and effectively determine at least one route between a first location on a road network and a second location on the road network. Thus, the concisely attributed segments may be utilized in a route calculation program for use with a navigation system application and map database. Commonly owned U.S. Pat. No. 6,192,314 B1 entitled "Method and System for Route Calculation in a Navigation Application" given to Khavakh et al., the contents of which are incorporated herein by reference, describes a program and method for route calculation in a navigation system application. Note that the exemplary embodiments are not limited for use in the route calculation application such as described in the U.S. Pat. No. 6,192,314, but they may be used with other route calculation programs.

I. Road Network and Data structure

Figure 1:
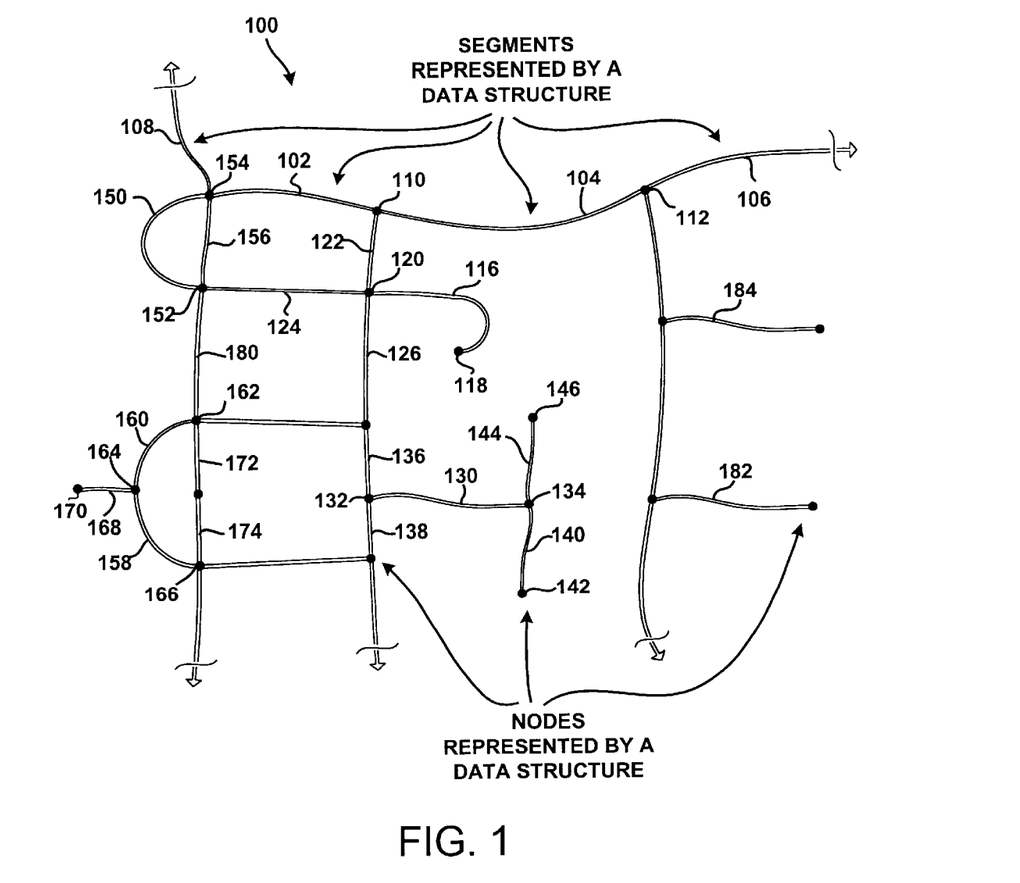
FIG. 1 shows a map that illustrates a road network within a portion of a geographic region.

FIG. 1 shows a map that illustrates a road network 100 within a portion of a geographic region. The road network 100 illustrates geographic navigable features, which among other things may include roadways and intersections of the roadways. Each of the geographic features is identified by its physical location (latitude, longitude, and optionally absolute or relative altitude). Other geographic features not shown in the road network 100 may include point-of interest locations such as a hotel, civic center, restaurant, and so on.

In one embodiment, each roadway in the road network 100 is represented by one or more segments, 102, 104, 106, 108 such as shown in FIG. 1, and so forth. A segment may represent a road or a portion of the road. Each road segment is shown to have associated with it two nodes. For example, segment 104 has two nodes 110 and 112 associated with it. One of the two nodes represents the point at one end of the segment and the other node represents the point at the other end of the segment. The node at either end of a segment may correspond to a location at which the road meets another road such as an intersection, or where the road dead-ends or terminates. It should be understood that the terms "nodes" and "segments" represent just one particular terminology for describing the components of the physical road network and other terminology for these features is encompassed within the scope of these concepts.

Figure 2:
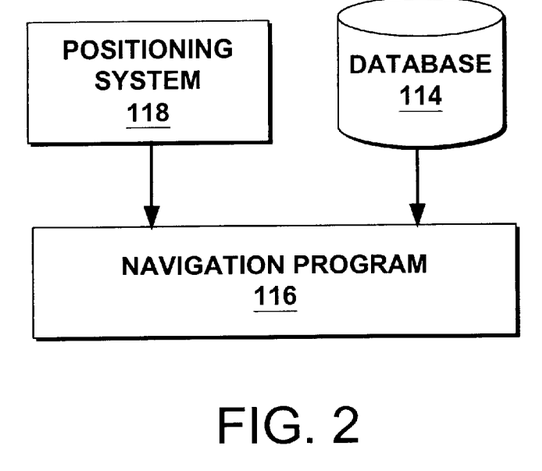
FIG. 2 shows a block diagram that illustrates a database for use by a navigation program.

Moving now to FIG. 2, data representing the road network 100, and more specifically the geographic navigable features, is represented in a computer usable database(s) 114 for use by a computer based application such as a navigation program 116. Accordingly, the data may be arranged, structured, and/or stored in a data structure format for storage on the database(s) 114. The navigation program 116 may optionally use other equipment such as a positioning system 118 to determine the end-user's physical location.

Figure 3:
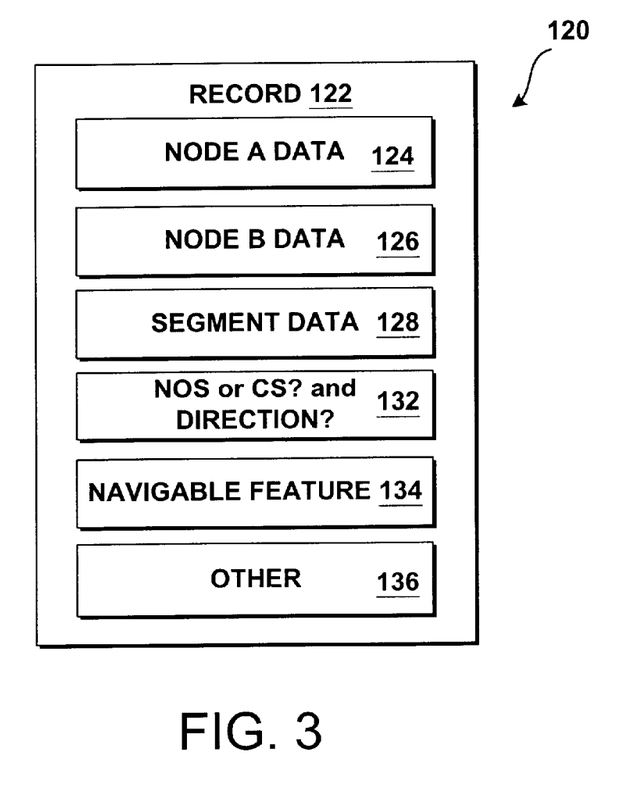
FIG. 3 shows a block diagram that illustrates an exemplary data structure for representing a road segment delimited by two associated nodes in the database of FIG. 2.

FIG. 3 illustrates an exemplary data structure 120 representing an exemplary road segment delimited by two associated nodes, node A and node B. In an exemplary embodiment, the data structure includes data fields 124, 126, 128, 132, 134, and 136 to store data that represent the segment and its two nodes. Generally, each segment in the road network 100 may be represented by a data structure in the database 114. In an exemplary embodiment, the database structure may include a record 122, but in an alternate embodiment the database structure may include a file, list, array, tree, table, and so on, depending on the particular application.

According to the exemplary embodiment, the record 122 may have associated with it data that allows identification of the nodes associated with the segment and/or the geographic positions (e.g., the latitude and longitude coordinates) of the two nodes. Such information may be placed as attributes in the fields 124, 126, and 128 in the data structure 120 for node A, node B, and the segment, respectively, as shown in FIG. 3.

Moreover, the navigable feature field 134 in the record 122 contains information, such as the name of the road, about that segment to be associated with other connected segments in the road network 100. For example, a road may include several segments. Accordingly, each of the several segments may contain the same data, such as an identifier, in their respective navigable feature field to associate them with the same road.

The record 122 may also have associated with it other useful information, for example more attributes may be placed in other fields 136 that specify the speed of travel on the portion of the roadway represented by the segment, the direction of travel permitted on the road portion represented by the segment, what if any turn restrictions exist at each of the nodes which correspond to intersections at the ends of the road portion represented by the segment, the street address ranges of the roadway portion represented by the segment, and so on as desired.

In addition, each record 122 that represents an other-than-straight shape of the road segment may include one or more shape point data that define the other-than-straight shape of the road segment. These various attributes associated with a segment may be included in a single data structure 120, or may be included in more than one type of data structure that are related or cross-referenced to each other.

In the database 114 that stores/holds the data, which represents the road network 100, there may also be a data structure for each node in the geographic region. The node data structure may have associated with it information that allow identification of the segment(s) that connect to it and/or its geographic position such as its latitude and longitude coordinates.

In an exemplary embodiment, the record 122 includes a field 132 that directionally identifies the segment as a no-outlet segment (NOS) or circular segment (CS), or neither. For example, a NOS segment represents a roadway or portion of a roadway that "dead-ends" or terminates, or that eventually leads through other successor segments that dead-ends or terminates, or that has the successor segments that return back to the segment. The field 132 provides the direction in which the NOS segment or its successor segments dead-end or terminate. In comparison, a CS segment represents a roadway that returns to the same navigable geographic feature (e.g., the same road), or that eventually leads through other successor segments to the same geographic feature. The field 132 provides the direction in which the CS segment or its successor leads back to the same navigable feature.

According to an exemplary embodiment, the field 132 identifies the direction of the no outlet or circular outlet, but in an alternate embodiment a separate field identifying the direction may be placed in the data structure 120 or in another data structure. The following examples are provided below to better illustrate NOS and CS segments and their directionality. These examples, however, are merely exemplary and are not intended to cover every situation and it would be appreciated by one skilled in the art that the NOS and CS segments can be applied to a variety of situations.

(1) NOS Example

Referring back to FIG. 1, segment 116, among others, may be identified as a NOS segment from node 120 to node 118 because it terminates at node 118. Segment 116 has two associated nodes 118 and 120. Node 120 represents an intersection with successor segments 122, 124, and 126. Note that the segments 122, 124, and 126 are referred to as successor segments to segment 116 at node 120. Successor segments represent segments that are connected to a particular segment at the same node (e.g., they are successors to the segment). Node 118 represents a dead-end or termination point. Consequently, segment 116 at node 118 does not have any successor segments.

Therefore, the data structure (e.g., a data structure 120 in FIG. 3) for segment 116 would identify segment 116 as a NOS in the direction from the intersection at node 120 to the dead-end at 118. That is, segment 116 represents a road that leads to a no-outlet or dead-end road heading in the direction from node 120 to node 118. Moreover, the segment 116 also represents a road that provides an exit in the direction from the dead-end at node 118 to the intersection at node 120.

(2) NOS Example

According to another embodiment of the present application, segment 130 may be identified as a NOS segment from its two associated nodes 132 to 134. In this example, node 132 and node 134 each represent an intersection. Node 132 intersects with successor segments 136 and 138. Node 134 intersects with successor segments 140 and 144. Successor segments 140 and 144 may be identified as NOS segments for similar reasons as to the segment 116 in the first NOS example. Thus, successor segment 144 is a NOS segment from node 134 to node 146. Successor segment 140 is a NOS segment from node 134 to node 142.

Segment 130 represents a NOS segment from node 132 to node 134 because all of its successor segments 140 and 144 at node 134 dead-end or terminate. Moreover, segment 130 represents a road segment that provides an exit in the direction from the intersection at node 134 to the intersection at node 132. Note also that segment 130 would represent a NOS segment even if one of its successors (i.e., 140 or 144) was a CS back to node 134 or segment 130, as will be explained in more detail below.

In another related example, the NOS segments 130, 140, and 144 are ranked according to roadway significance (e.g., highway, city street, side-street, etc.). In this example, segment 130 might be ranked higher than its successor segments 140 and 144 because segment 130 is a main road and successor segments 140 and 144 are side roads off the main road. According to this exemplary embodiment, the NOS segment 130 (i.e., the segment with the highest ranking) would further represent the exit for the lower ranked successor segments 140 and 144.

Before continuing on with circular segments, it should be understood that an isolated portion of the road network might have one bi-directional road providing an entrance and exit to the isolated portion of the road network, and might also have a one-way road leading into the isolated portion of the road network. In such cases, the two segments (i.e., the bi-directional road and the one-way road) may be identified and attributed as no-outlet segments because the isolated portion of the road network still has only one exit.

(3) CS Example

According to an embodiment of the present application, segment 150, among others, may be identified as a CS segment from node 152 to node 154, and also from node 154 to node 152.

Segment 150 has two associated nodes 152 and 154, in which each represent an intersection. Thus, the successor segments at node 152 are 124, 156, and 180. The successor segments at node 154 are 102, 108, and 156.

Referring to the road network 100, it is visually apparent that segments 108, 156, and 180, and so on, represent the same roadway or a common navigable geographic feature. Therefore, to indicate that segments 108, 156, and 180 are the part of the same road, a navigable feature field (e.g., field 134 in FIG. 3) may contain information such as the name of the roadway, or an identifier common to each data structure representing segments 108, 156, and 180.

Segment 150 is identified as a CS segment from node 152 to node 154, and also from node 154 to node 152, because nodes 152 and 154 intersect with the same geographic feature. Consequently, the data structure for segment 150 would identify segment 150 as a CS segment from node 152 to node 154, and as a CS segment from node 154 to node 152.

(4) CS Example

According to another embodiment of the present application, segments 158 and 160 may both be represented as CS segments. Segment 158 has two associated nodes 164 and 166, which each represent an intersection. Segment 160 also has two associated nodes 162 and 164, which each represent an intersection. Three segments 158, 160, and 168 intersect at node 164. Using the above example, segment 168 may be identified as a NOS segment (terminates at node 170). Consequently, the data structure for both segments 158 and 160 would identify each segment as CS segment because the two segments 158 and 160 intersect with a common geographic feature (i.e., segments 172 and 174).

Thus, segment 160 would be identified as a CS segment from node 162 to node 164 (both successor segments 158 and 168 at node 164 either terminate or lead to the common navigable geographic feature). Similarly, segment 158 would be a CS segment from node 166 to node 164. Also, segment 160 represents a potential exit from node 164 to 162, and segment 158 represents a potential exit from node 164 to node 166.

(5) NOS and an Isolated Portion of a Road Network Example

Figure 4:
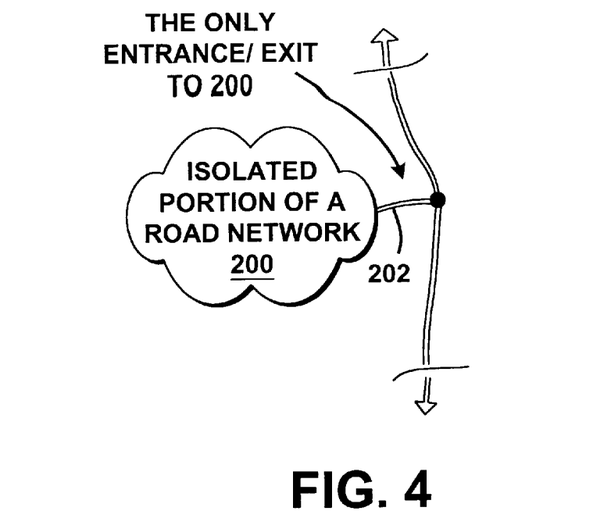
FIG. 4 shows a portion of a map to illustrate a no-outlet segment and an isolated portion of a road network.

FIG. 4 illustrates an exemplary isolated portion of a road network 200. An isolated portion of the road network represents one or more segments that are connected or grouped in a certain way to have one or more segments entering and/or exiting the network to the same navigable feature (e.g., entering and/or exiting to the same road), described in more detail below. In the example, the only entrance/exit of the isolated portion of the road network 200 is segment 202. Therefore, segment 202 may be identified as a NOS segment because as described above, a NOS segment represents a roadway or portion of a roadway that "dead-ends" or terminates, or that eventually leads through other successor segments to a dead-end, or that the successor segments return back to the segment. Thus, the isolated portion of the road network 200 may include segments that terminate, or segments that are circular in nature, but because it has only one entrance/exit, then the entrance/exit (i.e., segment 202) may be identified as a NOS segment into the isolated portion of the road network 200.

(6) CS and an Isolated Portion of a Road Network Example

Figure 5:
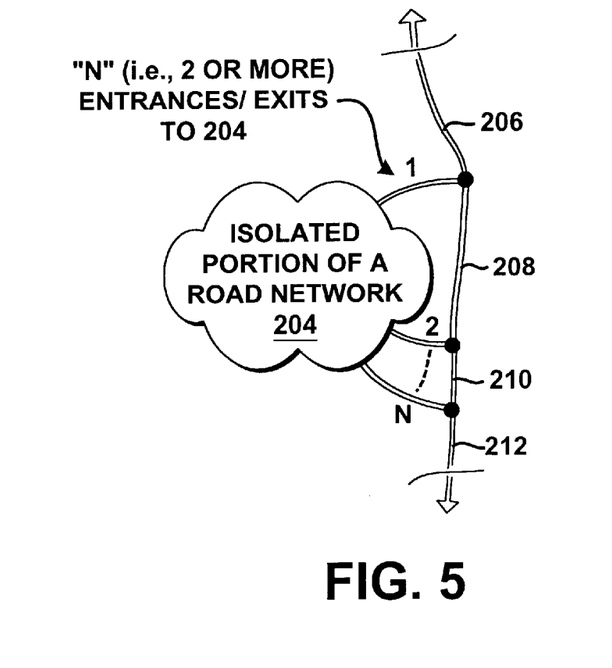
FIG. 5 shows a portion of a map to illustrate circular segments and an isolated portion of a road network.

FIG. 5 illustrates an exemplary isolated portion of a road network 204. As described above, an isolated portion of the road network represents one or more segments that are connected or grouped in a certain way to have one or more segments entering and/or exiting the network to the same navigable feature (e.g., entering and/or exiting to the same road). In this example, the isolated portion of the road network 204 has two or more, or "N" entrances/exits to the same geographic feature. Each of the "N" segments are CS segments, because as described above, a CS segment represents a roadway that returns to the same navigable geographic feature (e.g., another roadway), or that eventually leads through other successor segments to the same geographic feature. According to this example, the navigable geographic feature may be represented by segments 206, 208, 210, and 212.

II. Application of NOS and CS Segments in a Route Calculation (RC)

(1) RC Example

The navigation program 116 of FIG. 2 may be adapted to calculate at least one solution route between a first location (origin) of a road network and a second location (destination) on the road network 100 of FIG. 1. To find the at least one solution, the navigation program 116 can initiate two searches, one search initiating from the origin and the second search initiating from the destination. One search referred to as "OUTBOUND" initiates at the origin and spreads outwardly toward the destination. The other search referred to as "INBOUND" initiates at the destination and spreads inwardly toward the origin. The two searches may match at a common point such as a common segment or a node found by each search, thus determining a solution route. This may be repeated until the optimum solution route is determined.

Calculating a route may also include forming a search tree in each direction (one search from the origin and one search from the destination). When a segment is expanded, its one or more successor segments are identified at the segment's nodes and added to its respective search tree, thereby growing the tree of possible routes. Thus, each search tree is grown by identifying successor segments from the origin or destination. As each tree grows, it is checked to determine whether a solution route exists between the origin and the destination. A solution exists when a segment and/or node in one search tree (origin) matches to a common segment and/or node appearing in the other search tree (destination). When the two trees both contain a common segment, a route from the origin to the destination has been found.

Figure 6:
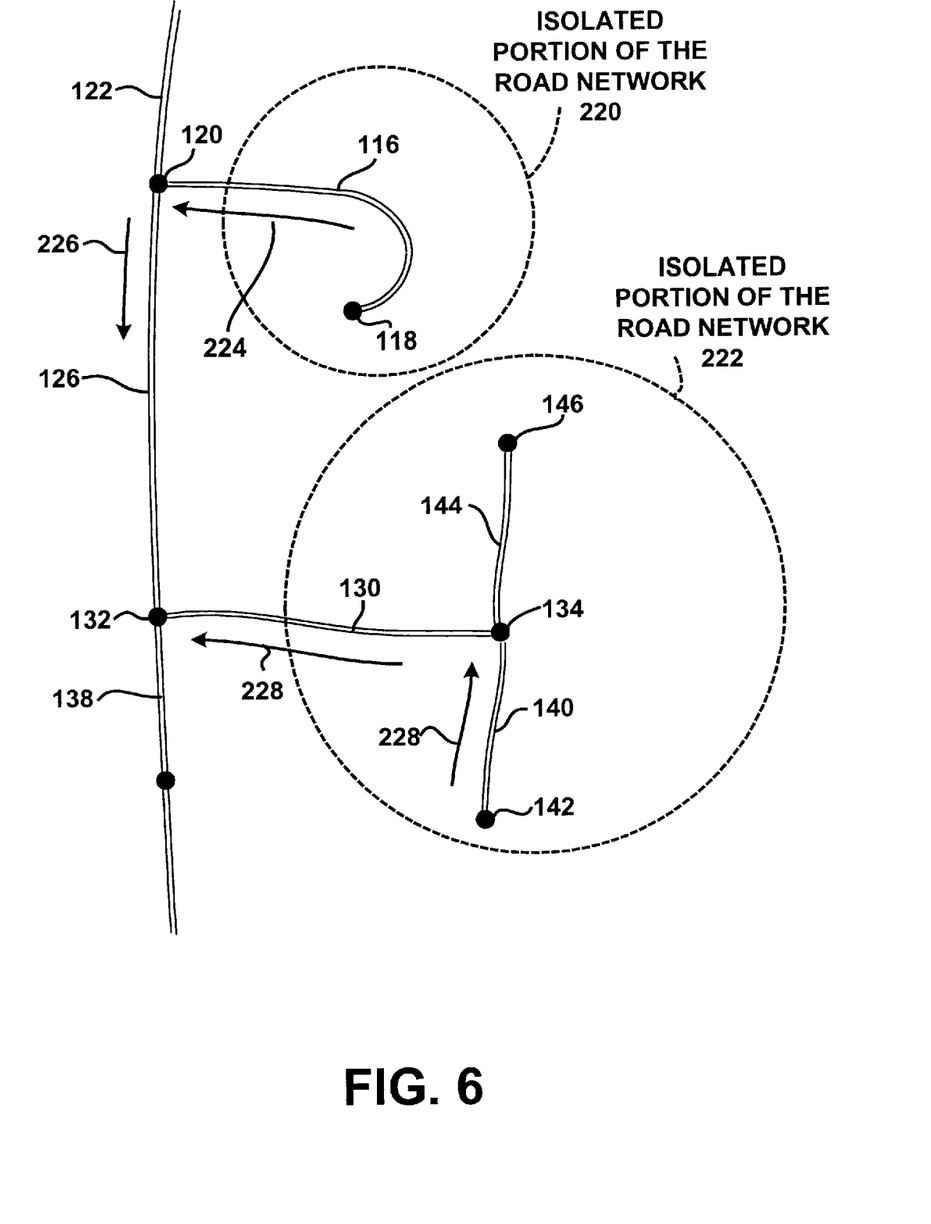
FIG. 6 shows a portion of the map of FIG. 1 to illustrate progression of an exemplary search.

FIG. 6 illustrates an exemplary search as it progresses through a part of the road network 100 of FIG. 1. For this example, assume that the origin is at node 118 and that the destination is along segment 140. Note that the origin is located in an isolated portion of the road network 220. Recall, an isolated portion of the road network may include a road network that is grouped in a certain way to have one or more segments entering and/or exiting the network. According to the above route calculation procedure, an OUTBOUND search tree is initiated at node 118 (the origin) and proceeds out of the isolated portion of the road network 220 to node 120, in the direction of arrow of 224. At node 120, successor segments 122 and 126 are retrieved such as by a function call in navigation program (116 in FIG. 2). Accordingly, the OUTBOUND search tree may further explore each successor segment 122 and 126. However for purposes of illustration, assume now that the search further explores segment 126 in the direction of arrow 226.

At node 132, the OUTBOUND search retrieves successor segments 130 and 138. The data structure that represents segment 130 identifies segment 130 as a NOS segment. (Recall from the second example above that the segment 130 is a NOS segment.) Consequently, the OUTBOUND search does not explore segment 130 or any of the segment's successors 140 and 144 because they lead to a dead-end or termination point. The OUTBOUND search carries forward its search by exploring segment 138.

An INBOUND search is initiated at node 142 and in the direction of the arrow of 228, the INBOUND search arrives at node 134. The successor segments 130 and 144 of segment 140 at node 134 are obtained. The successor segment 144 is identified as an NOS segment from node 134 to node 146, so the INBOUND search does not explore segment 144. The INBOUND search then determines that segment 130 is a NOS segment from node 132 to node 134, which means also that it is an exit from node 134 to node 132. Thus, the INBOUND search leaves segment 130 at node 132.

At node 132 the INBOUND search and the OUTBOUND search determine a route. Thus, if an origination point is within an isolated portion of the road network (e.g., isolated portion of the road network 220), a route calculation OUTBOUND search will eventually calculate a route out of the isolated portion of the road network through one of its segments (e.g., NOS or CS segments). Moreover, an OUTBOUND search does not need to enter a isolated portion of the road network (e.g., isolated portion of the road network 222), thereby freeing the route calculation from unnecessarilt examining the segment in the isolated portion of the road network because the INBOUND search will eventually exit the isolated portion of the road network (e.g., isolated portion of the road network 222) to meet the OUTBOUND search. Therefore, the OUTBOUND and INBOUND searches will match up at a segment and/or node to determine a route between the origination point and the destination point.

(2) RC Example

Figure 7:
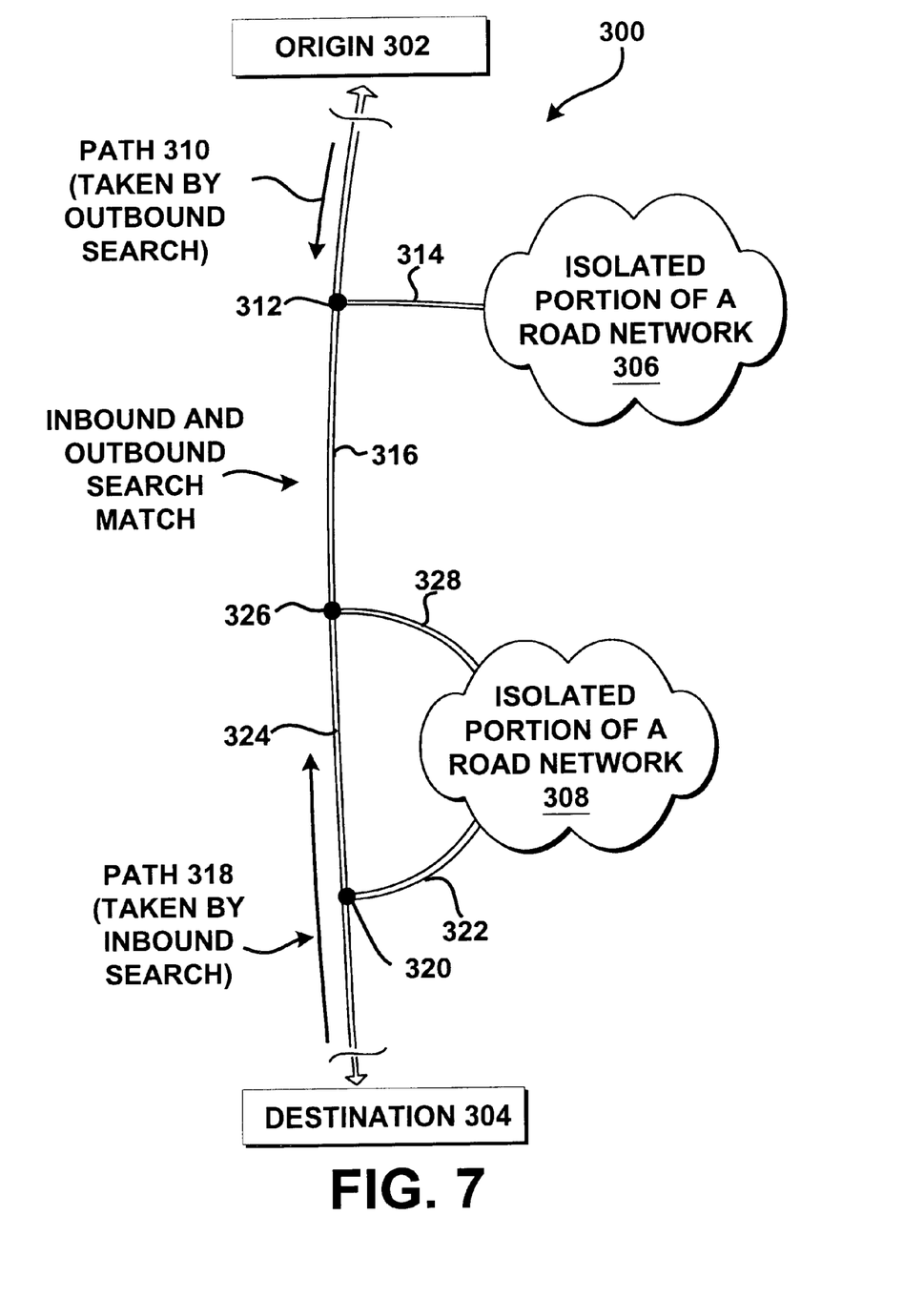
FIG. 7 shows a portion of a map to illustrate progression of another exemplary search.

FIG. 7 illustrates an exemplary search as it progresses through a part of another road network 300. This example uses a similar search process as in the RC example above. Note for this example that the origin 302 and destination 304 are not located within an isolated portion of a road network 306 and 308.

At the origin 302, an OUTBOUND search is initiated. Assume for this example, the path 310 taken by the OUTBOUND search is heading in the direction of the destination. Then the OUTBOUND search comes across node 312 where the successor segments 314 and 316 attached to node 312 are retrieved. The OUTBOUND search retrieves the successor segments 314 and 316 by retrieving their corresponding data structure (e.g., data structure 120 in FIG. 3). The OUTBOUND search examines the data structure for each of the successor segments 314 and 316, and determines that segment 314 is a NOS in the direction of the isolated portion of the road network 306. The OUTBOUND search does not enter and/or further examine segment 314 (and its successors, if any) because if the destination is within the isolated portion of the road network 306, a destination INBOUND search would exit and match the OUTBOUND search at node 312 to calculate a route. Thus, the OUTBOUND search is freed from unnecessarily examining segment 314 and any successors (e.g., segments in the isolated portion of the road network 306), thereby reducing the data necessary for consideration in the OUTBOUND route calculation.

At the destination 304, an INBOUND search is initiated. Assume that the path 318 taken by the INBOUND search is heading in the direction of the origin. Then the INBOUND search comes across node 320 where the successor segments 322 and 324 attached to node 320 are retrieved (e.g., by retrieving their corresponding data structure). The INBOUND search examines the data structure for each of the successor segments 322 and 324, and determines that segment 322 is a CS in the direction of the isolated portion of the road network 308. The INBOUND search does not enter and/or further examine segment 322 (and its successors, if any) because if the destination is within the isolated portion of the road network 308, an origin OUTBOUND search would exit and match the INBOUND search at node 320 (or node 326) to calculate a route. Thus, the INBOUND search is freed from unnecessarily examining segment 322 and any successors (e.g., isolated portion of the road network 308), thereby reducing the data necessary for consideration in the INBOUND route calculation.

The INBOUND search proceeds to search the segment 324, in which case, the search comes across node 326. The INBOUND search retrieves the segments 316 and 328. Consequently, a match is determined at segment 316 because it matches with the OUTBOUND search segment 316. Nevertheless, the INBOUND search may also determine from the segment 328 data structure that it is a CS segment. For the same reasons above, the INBOUND search would not explore further the segment 328 or any successors.

III. Alternate Embodiments

In an alternate embodiment, a data structure references a "Minimum Bounding Rectangle" (MBR) which encompasses a isolated portion of the road network. If the destination point is outside of the MBR (latitude, longitude, and optionally altitude) the segments within the MBR need not be considered. If the destination is within the MBR, the segment and all of its successors within the MBR may be considered in the route calculation. This method can have minimal impact on the database size because it needs only one data structure to be added to the no-outlet segments in the database.

In another embodiment, the data structure references a list of segment that are in a isolated portion of the road network. If the destination segment is not on the list, the segment and its successors need not be considered by a route calculation.

In an exemplary embodiment, the NOS and CS segments are classified by rank in accordance with a functional classification assigned to each road segment. The functional classification may be based on the importance or significance of the roadway for vehicle travel. For example, roadways of rank "0" may be alleyways and side streets, roadways of rank "1" may be primary city streets, roadways of rank "2" may be highways, roadways of rank "3" divided highways, and so on.

IV. Application of NOS and CS to Complex Intersections and Isolated Portions of a Road Network The techniques described above enhance the operation of a navigation system by identifying segments in the geographic data that terminate, lead to a "dead end", or return to the original feature. The navigation system may use the identification in determining whether to consider the segment and any of its successor segments in a route calculation.

Another way to enhance the operation of a navigation system is to provide special kinds of representations for certain geographic features. Thus, in addition to having data records that accurately represent the actual physical geographic features in a geographic region, the database may include substitute records that are used for certain navigation functions. These substitute records may provide abbreviated or shortcut representations of certain complex features. These substitute records may be used by certain navigation functions in the navigation application instead of the records that represent the actual features. This allows the navigation function to avoid the additional computations associated with handling of the data records that represent the actual complex features. Commonly owned U.S. Pat. No. 6,184, 823 entitled "Geographic database architecture for representation of named intersections and complex intersections and methods for formation thereof and use in a navigation application program" given to Smith et al., the contents of which are incorporated herein by reference, describes in particular, named and complex intersections for use in a navigation system application.

As described above, geographic data includes data structures that represent nodes and road segments. The node entities store positional information (i.e., latitude and longitude) about the end points of a road segment. (There may also be node entities that relate to positional information other than the end points of road segments.) The positional information related to each node is stored in terms of a longitude, latitude, and possibly an altitude. This node entity may also contain attributes which provide additional information about the node.

Route calculation may be sped up by including collapsed node data entities. Each of these collapsed nodes represents a plurality of closely-spaced or related regular nodes and segments. Wherever collapsed nodes are used to represent a plurality of regular nodes, each road segment that is connected to any of the nodes represented by the collapsed node from outside the collapsed node is associated with the collapsed node instead of with the regular nodes by the collapsed node. Then, when a route calculation search accesses any of these road segment records to calculate a route, the collapsed node record is identified as corresponding to the endpoint of the segment instead of one of the plurality of regular node records represented by the collapsed node. Including the collapsed node records has the effect of replacing certain complex intersections and/or isolated portion of the road networks in the database with simplified intersections. Replacing certain complex intersections and/or isolated portion of the road networks with simplified intersection representations reduces the time and data required for the route calculation function to calculate a route through these intersections.

According to the exemplary embodiment, if a collapsed node that replaces a certain complex intersection and/or an isolated portion of the road network which has only one entrance, the entrance segment can be identified and attributed as a NOS. If the collapsed node has more than one entrance segment, but each entrance segment leads to the same geographic feature (e.g., roadway, etc.) the entrance segments can be attributed as CS segments.

Some examples of such complex intersections and isolated portion of the road network that are represented by collapsed nodes are illustrated at FIGS. 8A, 8B, 9A, and 9B. For example, referring to FIG. 8A, there is a map illustrating an isolated portion of a road network 350. As described above, the isolated portion of the road network 350 may include a road network that is grouped in a certain way to have one or more segments entering and/or exiting the network. The isolated portion of the road network 350 has only one entrance segment 352 that may be identified as a NOS segment. According to the exemplary embodiment, the nodes and segments in the isolated portion of the road network 350 are collapsed into a single collapsed node 354 represented by a collapsed node record (similar to the record 122 in FIG. 3) in the database. The collapsed node record may represent the isolated portion of the road network 350 by identifying the only entrance segment 352 as a NOS segment.

Figure 8A:
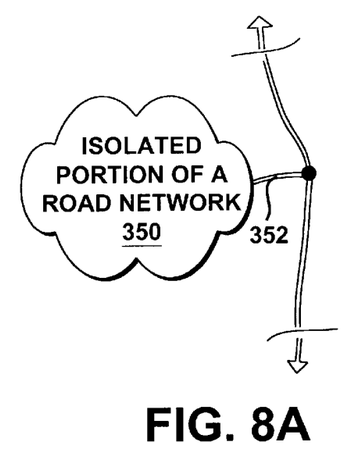
FIGS. 8A, 8B, 9A, and 9B show examples of complex intersections and isolated portions of a road network that may be represented by collapsed nodes.
Figure 8B:
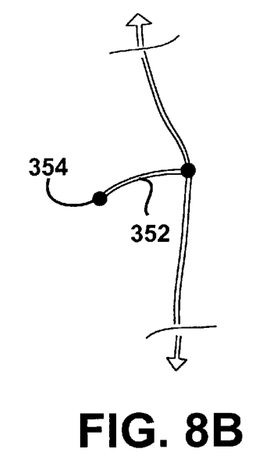
Figure 9A:
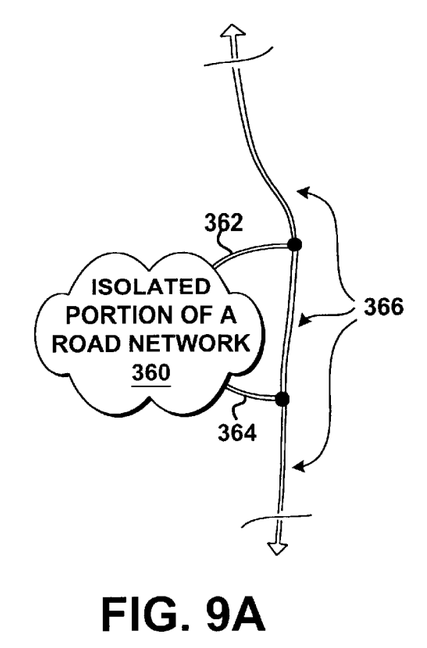
Figure 9B:
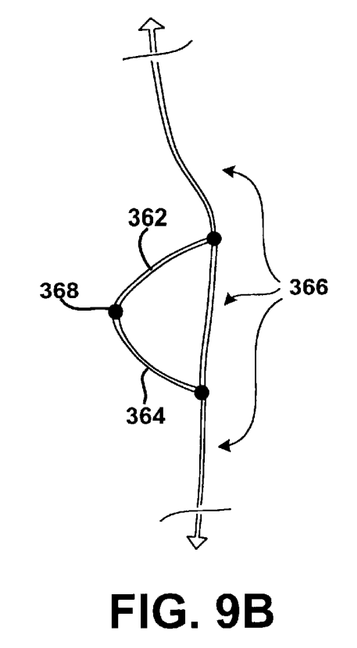

FIG. 8B shows a map graphically illustrating the collapsed node 354 that represents the isolated portion of the road network 350 of FIG. 8A. A collapsed node data record may be generated automatically during compiling of the data for route calculation. The segment records that represent the isolated portion of the road network 350 indicate that they connect to the collapsed node 354 instead of to node records that represent the actual nodes in the road network, respectively. Although the geometry of the road network appears different in the collapsed node 354 representation of FIG. 8B, all the attributes of the segment data records in the database, including the segment length, remain the same as they would for the full representation of the intersection. FIG. 9A shows a map illustrating another isolated portion of the road network 360. According to this example, the isolated portion of the road network 360 has two entrance/exit segments 362 and 364 leading back to the same navigable feature 366, where each may be identified as a CS segment. According to the exemplary embodiment, the nodes and segments in the isolated portion of the road network 360 are collapsed into a single collapsed node 368 represented by a collapsed node record in the database. The collapsed node record may indicate that it is a CZ 360 by identifying the two entrance/exit segments 362 and 364 as CS segments. Referring to FIG. 10B, a map graphically illustrating the collapsed node 368 represents the CZ 360 of FIG. 9B.

Collapsed node records may be used in a given level of the route calculation which may include the plurality of regular node records that are represented by the collapsed node record. This allows any information associated with the regular nodes to still be accessible to the navigation application program, if needed.

A function call in the navigation program can be used to translate a collapsed node back into the regular nodes and segments that it represents. Another function call can be used to retrieve an ordered list of the segments inside the collapsed node to be traversed in order to get from one segment connected to the collapsed node to another.

V. Identifying and Attributing a Segment as a NOS or CS Segment

In the exemplary embodiment, a segment in the road network 100 is automatically identifed and attributed as a NOS or CS segment, but in an alternate embodiment may be attributed manually (e.g., a data input operator reviews graphical display of map and attributes segments manually).

To identify and attribute a segment with two associated nodes referred to as "node A" and "node B" as a NOS segment, includes retrieving all successor segments attached to the node B. If there are no successor segments at node B, then the segment may be identified as a NOS segment from node A to node B. If there are successor segments at node B, then successor searches are performed at their nodes. The process is iteratively repeated until a threshold number of successor segments are considered, or until a segment with a threshold rank is discovered. If all successor searches terminate or lead back to the segment with node A and node B, then the segment may be identified and attributed as a NOS segment.

To identify and attribute a segment with two associated nodes referred to as "node A" and "node B" as a CS segment, includes retrieving all successor segments attached to the node B. If there are successor segments at node B, then successor searches are performed at their nodes. The process is iteratively repeated until a threshold number of successor segments are considered, or until a segment with a threshold rank is discovered. If all successor searches lead back to a common segment or group of interconnected segments (e.g., a road with the same name), the segment with node A and node B may be identified as a circular segment.

V. Advantages

As described herein, the exemplary embodiments provide an efficient and concise way to attribute a segment as a no-outlet segment or circular segment. A route calculation program may identify the attributed segment as a NOS or CS segment and based on the identification the program can determine whether to explore the segment. If the attributed segment is not a NOS or CS segment, the route calculation program may explore the segment by performing successor searches and exploring the successor segments of the segment.

By identifying the attributed segment as a NOS or CS segment, the number of segments that are considered by a route calculation program may be reduced. This can provide for an efficient utilization of available computer resources in a navigation system application. Moreover, a faster response time in navigation systems may be achieved. Systems with faster response time may process and/or provide navigation information quickly.

It should be understood that the programs, processes, methods and systems utilized or described herein are not related or limited to any particular type of vehicle positioning or database system, unless indicated otherwise. For example, positioning systems in planes, boats, and handheld systems may utilize the methods exemplified herein. In view of the wide variety of embodiments to which the principles of the present embodiments can be applied, it should be understood that the illustrated embodiments are exemplary only, and should not be taken as limiting the scope of the present invention. For example, more or fewer elements may be used in the figures.

The claims should not be read as limited to the described order or elements unless stated to that effect. All embodiments that come within the scope and spirit of the following claims and equivalents thereto are claimed as the invention.

What is claimed is:

1. An improved method of operation for a route calculation program used with a map database stored on a computer readable storage medium, wherein the route calculation program includes program instructions adapted to find a solution route between a first location on a road network represented by the map database and a second location on the road network represented by the map database, wherein the road network is represented in the map database by data that represent each segment of each road between endpoints thereof, and wherein the program instructions find the solution route by evaluating attributes of the represented segments of roads in order to determine a series of segments connecting the first location and the second location, wherein the improved method of operation for the route calculation program comprises:
   determining from an attribute stored in the map database whether a first segment is connected to an isolated portion of the road network while evaluating attributes of represented segments for inclusion in the solution route; and
   upon a determination that the first segment is connected to an isolated portion, determining whether to evaluate additional segments in the isolated portion of the road network for inclusion in the solution route.

2. The method of claim 1 further comprising:
   refraining from evaluating the additional segments in the isolated portion of the road network upon the determination that the first segment is connected to an isolated portion.

3. The method of claim 1 wherein the first segment is the only segment that connects a non-isolated portion of the road network with the isolated portion of the road network.

4. The method of claim 3 wherein the attribute indicates that the first segment is a no-outlet segment.

5. The method of claim 3 further comprising evaluating the first segment for inclusion in the solution route if the first segment is encountered from inside the isolated portion of the road network.

6. The method of claim 1 further comprising suppressing evaluation of additional segments located inside the isolated portion of the road network.

7. The method of claim 1 wherein the first segment is one of plural segments that connect the isolated portion of the road network to a non-isolated portion of the road network, wherein all of the plural segments connect to one road at different locations along the one road.

8. The method of claim 7 wherein the attribute indicates that the first segment is a circular segment.

9. The method of claim 1 wherein the isolated portion of the road network is a dead-end road.

10. The method of claim 1 wherein the isolated portion of the road network is represented in the map database as a collapsed node.

11. The method of claim 1 wherein the map database includes a plurality of data structures with attributes, wherein each data structure represents a road segment and its associated nodes.

12. A method for a route calculation search performed by a route calculation program, the method comprising:
   retrieving a data structure in a map database that represents a successor segment with a first node and a second node;
   identifying an attribute in the data structure that identifies the successor segment as a segment that connects an isolated portion of a road network at the second node thereof to a non-isolated portion of the road network at the first node thereof; and
   refraining from evaluating the isolated portion of the road network if the route calculation search retrieved the successor segment at the first node.

13. The method of claim 12 further comprising:
   determining a solution route by matching at the first node a first search initiated at an origin located in the non-isolated portion of the road network with a second search initiated at a destination located within the isolated portion of the road network.

14. In a navigation system in which geographic data are used by an end user's platform to provide navigation related features to an end user, a method comprising:
   using data structures in the end user's computing platform, wherein each data structure includes:
      a) fields with data that represent a segment of a road in a road network; and
      b) a data attribute in one of the fields that identifies the segment as one that connects a non-isolated portion of the road network with an isolated portion of the road network;
   wherein the end user's computing platform uses the attribute to determine whether to evaluate segments in the isolated portion of the road network for inclusion in a calculated route.

15. The method of claim 14 wherein the end user is located in a vehicle .

16. The method of claim 14 wherein the end user's computing platform comprises a navigation system unit in a vehicle.

17. A navigation system comprising:
- a map database for storing attributes that characterize segments of roads, including attributes that indicate whether a segment leads to an isolated portion of the road network; and
- a navigation program for calculating a route between a first location on the road network represented by the map database and a second location on the road network represented by the map database;

wherein the navigation program uses the attributes to determine whether to explore an isolated portion of the road network.

18. The method of claim 17 wherein the isolated portion of the road network is connected to a non-isolated portion of the road network by only a single road segment.

19. The method of claim 17 wherein the isolated portion of the road network is connected to a non-isolated portion of the road network by plural road segments, wherein all of the plural segments connect to one road at different locations along the one road.

* * * * *